Patented Aug. 15, 1950

2,519,280

UNITED STATES PATENT OFFICE 2,519,280

METHOD AND COMPOSITION FOR MAKING CERAMIC ARTICLES

John F. Potter and Merle D. Rigterink, Summit, N. J., assignors to Bell Telephone Laboratories, Incorporated, New York, N. Y., a corporation of New York No Drawing. Application April 26, 1947, Serial No. 744,162

7 Claims. (Cl. 106—65)

This invention relates to ceramic compositions containing a novel temporary organic plasticizer and binder and to a method of making ceramic articles in which said novel temporary organic plasticizer and binder is used.

More particularly this invention comprises using a gel of polyvinyl alcohol as a temporary plasticizer and binder for a mass of ceramic particles. After the mixture of binder and ceramic material has been shaped to the desired form, the article is fired to drive off or to burn off the organic material.

In the past it has been the practice with non-plastic ceramic compositions to use gels of various materials, such as starch or flour, as temporary binders in forming ceramic articles. These gels however have the disadvantage of being unstable, and if they are allowed to stand for any length of time they break down and revert back to the sol form. Also these gels tend to become covered with mold if they are allowed to stand for even a few hours. Frequently, preservative compounds were added to these gels to prevent the formation of mold, but this was undesirable because they were not completely successful in preventing the mold and usually were objectionably odorous.

Many gels made from synthetic chemicals or natural materials other than starch or flour have been tried as temporary plasticizers and binders for non-plastic composition materials containing little or no clay. These have been found to be unsatisfactory, because they did not render sufficient plasticity to the mass. Consequently, during the extrusion the phenomenon of dilatation was observed whereby the water was squeezed out leaving the powdered ceramic material behind in the extrusion chamber. Particular difficulty was encountered in forming such a mass into thin tubes because of its lack of sufficient strength or plasticity.

Also the gels previously used as binders frequently did not dry properly so that the final objects often were warped and cracked, or covered with a hard surface skin caused by diffusion to the surface.

Polyvinyl alcohol in aqueous solution or colloidal suspension, rather than in the gel form, has been used as a binder for ceramic materials. However, this proved to be unsatisfactory because it did not impart sufficient plasticity to the mixture to be shaped.

According to the present invention the above-mentioned difficulties are avoided by forming a gel made from polyvinyl alcohol, mixing it with a mass of powdered ceramic material, and firing the mixture to drive off or to burn off the organic material and to harden the ceramic mass. The gels produced by the present invention are stable and may stand for months without breaking down. They also do not support the growth of mold.

When mixed with a mass of ceramic particles, the polyvinyl alcohol gel contributes sufficient strength and plasticity to the mass so that it may be easily extruded into thin tubes. Also this gel is easily dried so that a formed article has no surface skin, and is not warped or cracked. Also it is easily and completely combustible so that the finished article is free of imperfections and contains no impurities detrimental to the electrical properties.

A further advantage in using the polyvinyl alcohol gel for a binder is that this gel contributes more plasticity to the ceramic mass so that less binder has to be used than with the gels commonly in use. This assists in forming more dense and stronger dried or fired articles. Also the polyvinyl alcohol gel is water soluble, which is desirable for certain purposes.

It is believed that one reason the polyvinyl alcohol gel binder produces a stronger and more plastic mass than other gel binders is that polyvinyl alcohol has a thin linear molecule, while some of the other gel forming materials, such as starch, have a more voluminous molecule. Another reason for the superior strength of the polyvinyl alcohol gel is that the ratio of organic material to water is larger than with other known gel-forming organic materials. It is believed that both of these factors cause the polyvinyl alcohol gel to be stronger and prevent its destruction in the mass when pressure is applied during extrusion.

The polyvinyl alcohol most suitable for use in the present process is prepared by hydrolyzing polyvinyl acetate or any other polyvinyl ester of an organic monocarboxylic acid, whether aliphatic, aromatic or aliphatic-aromatic, such as polyvinyl formate, propionate, butyrate or benzoate. The final product contains at least 90 per cent polyvinyl alcohol, the remainder of the product comprising the unhydrolyzed polyvinyl compound. The molecular weight of the polyvinyl alcohol is approximately 20,000 to 30,000.

In making the gel, sufficient finely divided polyvinyl alcohol is mixed with water to form a suspension comprising from about 10 per cent to about 20 per cent by weight of polyvinyl alcohol. The best results are obtained when the suspension contains from about 13 per cent to about 15 per cent by weight of polyvinyl alcohol. The suspension is then agitated in a recirculating colloid mill or an Eppenbach Homo-Mixer or an equivalent device capable of thoroughly dispersing the polyvinyl alcohol. This agitation gradually raises the temperature of the suspension; the more vigorous the agitation, the more rapid the temperature rise. The temperature of the suspension is allowed to rise until a temperature of between about 65° C. and about 75° C., but preferably of about 70° is reached. When the solution has reached this temperature the stirring may be continued for no longer than about five minutes after which it is stopped. The dispersion will then set to a translucent gel if allowed to stand at room temperature for a period of time, after which no appreciable change occurs. The time for gelation depends upon the rate at which the temperature of the suspension is brought up to its final value by agitation, being longer the more rapid the temperature rise. When 1000 cc. of the suspension are stirred in a 1500 cc. beaker, using an Eppenbach Homo-Mixer, at such a rate as to bring the temperature of the suspension from room temperature to 70° C. in about 1 hour, the resulting suspension will set to a gel in about 24 hours.

If the stirring is allowed to continue too long after the dispersion has reached the temperature of about 65° C. to 75° C., so that the temperature reaches a higher value, such as 80° C., the gel becomes too stiff for the intended application. If the stirring is discontinued before the temperature of 65° C. to 75° C. is reached, the gel may reach the proper consistency only on long standing. The application of external heat during the period of agitation increases the length of time for the dispersion to set to a gel or prevents entirely the formation of the gel.

If desired, from about 1 per cent to about 5 per cent by weight of dextrin may be added to the suspension of the polyvinyl alcohol before it is subjected to the step of agitation. Other substances which may be used instead of dextrin are starch, Goulac (a lignin extract), or various gums, such as gum arabic. These substances when present in the gel give additional strength to the dried ceramic mass so that it may be more readily machined before firing.

Other types of polyvinyl alcohol besides that described above may be used, although the conditions for the formation of the gel have been described particularly with respect to polyvinyl alcohol containing not more than about 10 per cent of unhydrolyzed ester and having the approximate molecular weight previously mentioned.

The gel may be mixed with a powdered ceramic material in a double motion paddle mixer or some other similar dough mixer to form a plastic mass. About 15 per cent to about 25 per cent of the gel by weight may be mixed with the ceramic material, although these proportions are not critical. The amount of gel used will depend partly on the dimensions of the article and partly on the method to be used for forming the ceramic article. For example, more of the gel is ordinarily used for forming the article by extrusion than for forming it by pressure.

After the article is formed into the desired shape it is air dried or heated slowly to drive off the water, after which it is heated at a higher temperature to cause the organic binder to depolymerize and to volatilize or burn from the ceramic mass. After the binder is removed the ceramic mass is further heated to a temperature high enough to form a strong sintered or vitrified material. The temperature of heating depends on the nature of the ceramic material.

Although the polyvinyl alcohol gel may be used as a binder for nearly all types of ceramic materials, it is particularly useful for binding aluminum oxide, magnesium oxide, and similar materials which have little or no plasticity of their own.

The polyvinyl alcohol gel may be used as a binder for ceramic materials in various types of forming processes such as pressing, tamping or extrusion. The gel is particularly useful in extrusion processes, however.

It is to be understood that the form of the invention herewith shown and described is to be taken as a preferred example of the same, and that various changes may be made in the steps of the method, and that known chemical equivalents may be employed, and that changes may be resorted to in the proportions of the ingredients, without departing from the spirit of the invention.

What is claimed is:

1. The method of forming a shaped ceramic article comprising mixing finely divided ceramic material with a sufficient amount of a polyvinyl alcohol gel to form a plastic mass, forming said mixture into a shaped body, drying said body and firing said body to form said shaped ceramic article.

2. The method of forming a shaped ceramic article comprising mixing finely divided ceramic material with from about 15 per cent to about 25 per cent by weight of an aqueous polyvinyl alcohol gel containing between about 10 per cent and about 20 per cent of polyvinyl alcohol based on the weight of the gel, forming said mixture into a shaped body, drying said body and firing said body to form the ceramic article.

3. The method of forming a shaped ceramic article comprising mixing finely divided ceramic material with from about 15 per cent to about 25 per cent by weight of an aqueous polyvinyl alcohol gel containing between about 10 per cent and about 20 per cent of polyvinyl alcohol based on the weight of the gel, said polyvinyl alcohol having an average molecular weight of about 20,000 to 30,000 and having not more than about 10 per cent of its alcohol groups esterified, extruding said mixture to form a shaped body, drying said body, and firing said body to form the ceramic article.

4. The method described in claim 3 wherein the finely divided ceramic material is aluminum oxide.

5. A plastic ceramic composition capable of being extruded and fired to form a ceramic body, said composition comprising finely divided ceramic material having intimately mixed therewith a sufficient amount of an aqueous polyvinyl alcohol gel to form a plastic mass.

6. A plastic ceramic composition capable of being extruded and fired to form a ceramic body, said composition comprising finely divided ceramic material having intimately mixed therewith between about 15 per cent and about 25 per cent by weight of an aqueous polyvinyl alcohol gel containing between about 10 per cent and about 20 per cent of polyvinyl alcohol based on the weight of the gel.

7. A composition as described in claim 6 wherein the finely divided ceramic material is aluminum oxide.

JOHN F. POTTER.
MERLE D. RIGTERINK.

REFERENCES CITED

The following references are of record in the file of this patent:

UNITED STATES PATENTS

| Number | Name | Date |
|---|---|---|
| 2,360,479 | Detrick et al. | Oct. 17, 1944 |